(12) United States Patent
Hughes et al.

(10) Patent No.: US 12,466,965 B2
(45) Date of Patent: Nov. 11, 2025

(54) INFUSIBLE WATERBORNE PIGMENTED RESIN COMPOSITIONS AND METHODS OF PREPARING AND USING THE SAME

(71) Applicant: ARMSTRONG WORLD INDUSTRIES, INC., Lancaster, PA (US)

(72) Inventors: John E. Hughes, Lincoln University, PA (US); Gilbert W. Fitzhugh, Lititz, PA (US); Charles G. Krick, Lititz, PA (US); Anthony L. Wiker, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 496 days.

(21) Appl. No.: 17/856,650

(22) Filed: Jul. 1, 2022

(65) Prior Publication Data

US 2023/0008232 A1  Jan. 12, 2023

Related U.S. Application Data

(60) Provisional application No. 63/218,003, filed on Jul. 2, 2021.

(51) Int. Cl.
*C09D 7/65* (2018.01)
*C09D 5/02* (2006.01)
(Continued)

(52) U.S. Cl.
CPC ............... *C09D 7/65* (2018.01); *C09D 5/022* (2013.01); *C09D 5/18* (2013.01); *C09D 7/41* (2018.01);
(Continued)

(58) Field of Classification Search
CPC . C09D 7/65; C09D 5/022; C09D 5/18; C09D 7/41; C09D 7/45; C09D 7/61; C09D 7/63; C09D 131/04; C09D 133/04; C09D 167/00; D06M 11/72; D06M 15/507; D06M 2101/32; D06M 2200/30; D06P 1/44; D06P 1/5228; D06P 1/525; D06P 1/5257; D06P 1/5271; D06P 1/613; D06P 1/67366;
(Continued)

(56) References Cited

U.S. PATENT DOCUMENTS

2004/0110870 A1   6/2004  Liu
2016/0030789 A1*  2/2016  Cordani ............... A62D 1/0064
                                                          252/2
(Continued)

FOREIGN PATENT DOCUMENTS

JP    2002294018 A  * 10/2002
KR    10-1331156 B1    11/2013
(Continued)

*Primary Examiner* — Matthew D Matzek
(74) *Attorney, Agent, or Firm* — Patrick Sheldrake (57) ABSTRACT

Described herein are compositions useful for infusing color into nonwoven polyester containing product and methods to do so. Such compositions and methods comprise use of a color infusion composition comprising an antimigrant polymer; pigment; ammonium polyphosphate; and an anionic surfactant comprising phosphate. In certain embodiments, thermoplastic polymer having a glass transition temperature (Tg) of 93.0° C. or less is used to enhance color infusion.

20 Claims, 3 Drawing Sheets

(51) Int. Cl.
  *C09D 5/18*      (2006.01)
  *C09D 7/41*      (2018.01)
  *C09D 7/45*      (2018.01)
  *C09D 7/61*      (2018.01)
  *C09D 7/63*      (2018.01)
  *C09D 131/04*    (2006.01)
  *C09D 133/04*    (2006.01)
  *C09D 167/00*    (2006.01)
  *D06M 11/72*     (2006.01)
  *D06M 15/507*    (2006.01)
  *D06M 101/32*    (2006.01)

(52) U.S. Cl.
  CPC .............. *C09D 7/45* (2018.01); *C09D 7/61* (2018.01); *C09D 7/63* (2018.01); *C09D 131/04* (2013.01); *C09D 133/04* (2013.01); *C09D 167/00* (2013.01); *D06M 11/72* (2013.01); *D06M 15/507* (2013.01); *D06M 2101/32* (2013.01); *D06M 2200/30* (2013.01)

(58) Field of Classification Search
  CPC ... D06P 3/52; D06P 2001/0092; C08K 3/013; C08K 3/04; C08K 5/0041; C08K 2003/2251; C08K 2003/323
  USPC ........................................................ 442/141
  See application file for complete search history.

(56) References Cited

U.S. PATENT DOCUMENTS

2017/0056698 A1*  3/2017  Pai .................. A62D 1/0042
2018/0142156 A1*  5/2018  Cha ..................... C09K 21/10

FOREIGN PATENT DOCUMENTS

| WO | WO-2004033585 A1 * | 4/2004 | ............ C08K 9/04 |
| WO | WO 2008/155187 A1 | 6/2016 | |
| WO | WO 2016/102908 A1 | 6/2016 | |

\* cited by examiner

INFUSIBLE WATERBORNE PIGMENTED RESIN COMPOSITIONS AND METHODS OF PREPARING AND USING THE SAME

CROSS-REFERENCE TO RELATED APPLICATIONS

This application claims the benefit of U.S. Provisional Application No. 63/218,003, filed on Jul. 2, 2021. The disclosure of the above application is incorporated herein by reference.

FIELD OF THE DISCLOSURE

The present disclosure relates to compositions useful for color infusions into polyester containing nonwoven webs, and more particularly to infusible waterborne pigmented compositions.

BACKGROUND

Nonwoven acoustical felt products are typically made of polyester. Utilization of homopolymers or copolymers of polyethylene terephthalate (PET) within such nonwoven products are useful as they typically meet interior building code requirements, when combined with fire retardants, by passing the ASTM E-84 Class A flame-spread/smoke requirements and/or passing the NFPA 286 room corner test. These PET structures are entirely organic and flammable, they shrink and melt away from flame and heat, thereby extinguishing the flame-front. Significantly, PET containing nonwoven acoustical felt also tends to not emit volatile gas phase molecules which can lead to flash-over in a room fire. Manufacturers of these polyester webs typically incorporate flame-retardant into the compositional fibers to extinguish any flaming droplets of melted plastic.

Polyester nonwoven felt products are relatively expensive and colored products are even more expensive because the fibers must be colored either in the fiber forming process or direct dyed. As such, both processes require ordering large lots of product (with minimum order quantities of 4 to 10 tons). Thus, custom colored products cannot be provided by a web manufacturer on demand, and not in small quantities.

Furthermore, the colorization of polyester nonwoven products may affect the flame spread control and/or smoke performance of the product.

Thus, there is a need for the improved capability to impart permanent durable color to basic nonwoven polyester felts. Additionally, there is a need to impart permanent durable color to basic nonwoven polyester felts without negatively affecting flame spread control and/or smoke performance of the product. Embodiments of the present invention are directed to meeting these needs.

SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

Applicants have discovered compositions useful for color infusions into materials comprising polyester nonwoven webs. Such compositions include waterborne pigmented resin compositions.

Thus, in certain embodiments, the present invention provides a composition comprising an antimigrant polymer; pigment; ammonium polyphosphate; and an anionic surfactant comprising phosphate. In certain embodiments, the antimigrant polymer has a viscosity of about 900 cps to about 5000 cps. In certain embodiments, the antimigrant polymer has a pH of between 5.5 to 8.0. In certain embodiments, the pigment is selected from phthalocyanines, naphthols, arylides, inorganics, inorganic oxides, carbon black, chromium oxide, or combinations thereof. In certain embodiments, the pigment is present in an amount from about 0.05% to about 20.0%, based on the weight of the composition. In certain embodiments, the ammonium polyphosphate has a pH of about 6.5. In certain embodiments, the ammonium polyphosphate has a density of about 1.9 $g/cm^3$ at 25° C. In certain embodiments, the ammonium polyphosphate has a viscosity of about 100 mPa·s at 25° C. In certain embodiments, the anionic surfactant is a polyoxyethylene branched tridecyl phosphate. In certain embodiments, the composition is a liquid. In certain embodiments, the invention is directed to a method to infuse color into a polyester product, comprising exposing the polyester product to a composition as described herein. In certain embodiments of the method, the polyester product is a polyester felted product.

In certain embodiments, the invention is directed towards a composition comprising an antimigrant polymer; pigment; ammonium polyphosphate; a thermoplastic polymer having a glass transition temperature (Tg) of 93.0° C. or less; and an anionic surfactant comprising phosphate. In certain embodiments, the antimigrant polymer has a viscosity of about 900 cps to about 5000 cps. In certain embodiments, the antimigrant polymer has a pH of between 5.5 to 8.0. In certain embodiments, the pigment is selected from phthalocyanines, naphthols, arylides, inorganics, inorganic oxides, carbon black, chromium oxide, or combinations thereof. In certain embodiments, the pigment is present in an amount from about 0.05% to about 20.0%, based on the weight of the composition. In certain embodiments, the ammonium polyphosphate has a pH of about 6.5. In certain embodiments, the ammonium polyphosphate has a density of about 1.9 $g/cm^3$ at 25° C. In certain embodiments, the ammonium polyphosphate has a viscosity of about 100 mPa·s at 25° C. In certain embodiments, the anionic surfactant is a polyoxyethylene branched tridecyl phosphate. In certain embodiments, the thermoplastic polymer is selected from sulfonated polyester, poly(vinyl acetate), acrylic, and vinylacrylic. In certain embodiments, the thermoplastic polymer is present in an amount from about 0.001% to about 60.0%, based on the dry weight of the product. In certain embodiments, the composition is a liquid. In certain embodiments, the dry percent ratio of ammonium polyphosphate to the thermoplastic polymer is between 0.45 to 0.75. In certain embodiments, the invention is directed towards a method to infuse color into a polyester product, comprising exposing the polyester product to a composition as described herein. In certain embodiments, the polyester product is a polyester acoustical felted product.

In certain embodiments, the invention is directed towards a nonwoven polyester product comprising a composition comprising an antimigrant polymer; pigment; ammonium polyphosphate; and an anionic surfactant comprising phosphate. In certain embodiments, the antimigrant polymer has a viscosity of about 900 cps to about 5000 cps. In certain embodiments, the antimigrant polymer has a pH of between 5.5 to 8.0. In certain embodiments, the antimigrant polymer is present in an amount of about 0.1 to about 3.0%, based on the dry weight of the product. In certain embodiments, the pigment is selected from phthalocyanines, naphthols, arylides, inorganics, inorganic oxides, carbon black, chromium oxide, or combinations thereof. In certain embodiments, the pigment is present in an amount from about 0.05% to about 20.0%, based on the dry weight of the product. In certain embodiments, the ammonium polyphosphate has a pH of about 6.5. In certain embodiments, the ammonium polyphosphate has a density of about 1.9 g/cm$^3$ at 25° C. In certain embodiments, the ammonium polyphosphate has a viscosity of about 100 mPa·s at 25° C. In certain embodiments, the ammonium polyphosphate is present in an amount from about 20.0% to about 35.0%, based on the dry weight of the product. In certain embodiments, the anionic surfactant is a polyoxyethylene branched tridecyl phosphate. In certain embodiments, the anionic surfactant is present in an amount from about 4.0% to about 20.0%, based on the dry weight of the product. In certain embodiments, the product further comprises a thermoplastic polymer having a glass transition temperature (Tg) of 93.0° C. or less. In certain embodiments, the thermoplastic polymer is selected from sulfonated polyester, poly(vinyl acetate), acrylic, and vinyl-acrylic. In certain embodiments, the thermoplastic polymer is present in an amount from about 0.001% to about 60.0%, based on the dry weight of the product. In certain embodiments, the thermoplastic polymer is present in an amount from about 35.0% to about 60.0%, based on the dry weight of the product. In certain embodiments, the dry percent ratio of ammonium polyphosphate to thermoplastic polymer is between 0.45 to 0.75.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present invention will become more fully understood from the detailed description and the accompanying drawings, wherein.

DETAILED DESCRIPTION

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other applications and methods. It is to be understood that the invention is not limited in its application to the details of any particular embodiment shown. The terminology used herein is for the purpose of description and not to limit the invention, its application, or uses.

As used herein and in the appended claims, the singular forms "a", "an", and "the" include plural references unless the context dictates otherwise. The singular form of any class of the ingredients refers not only to one chemical species within that class, but also to a mixture of those chemical species. The terms "a" (or "an"), "one or more" and "at least one" may be used interchangeably herein. The terms "comprising", "including", "containing", and "having" may be used interchangeably. The term "include" should be interpreted as "include, but are not limited to". The term "including" should be interpreted as "including, but are not limited to".

As used throughout, ranges are used as shorthand for describing each and every value that is within the range. Any value within the range can be selected as the terminus of the range.

Unless otherwise specified, all percentages and amounts expressed herein and elsewhere in the specification should be understood to refer to percentages by weight of the total composition. Unless otherwise specified, reference to a molecule, or to molecules, being present at a "wt. %" refers to the amount of that molecule, or molecules, present in the composition based on the total weight of the composition.

According to the present application, use of the term "about" in conjunction with a numeral value refers to a value that may be +/−5% of that numeral. As used herein, the term "substantially free" is intended to mean an amount less than about 5.0 wt. %, less than 3.0 wt. %, 1.0 wt. %; preferably less than about 0.5 wt. %, and more preferably less than about 0.25 wt. % of the composition.

Unless defined otherwise, all technical and scientific terms used herein have the same meanings as commonly understood by one of ordinary skill in the art to which this invention belongs. All patents, patent applications, publications, and other references cited or referred to herein are incorporated by reference in their entireties for all purposes. In the event of a conflict in a definition in the present disclosure and that of a cited reference, the present disclosure controls.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing (if applicable) under discussion. These relative terms are for convenience of description only and do not require that the apparatus be constructed or operated in a particular orientation.

As used herein, terms such as "attached," "affixed," "connected," "coupled," "interconnected," and the like refer to a relationship wherein structures are secured or attached to one another either directly or indirectly through intervening structures, as well as both movable or rigid attachments or relationships, unless expressly described otherwise. Accordingly, the disclosure is not limited to such exemplary embodiments illustrating certain combinations of features that may exist alone or in combination with other features.

Figure 1:
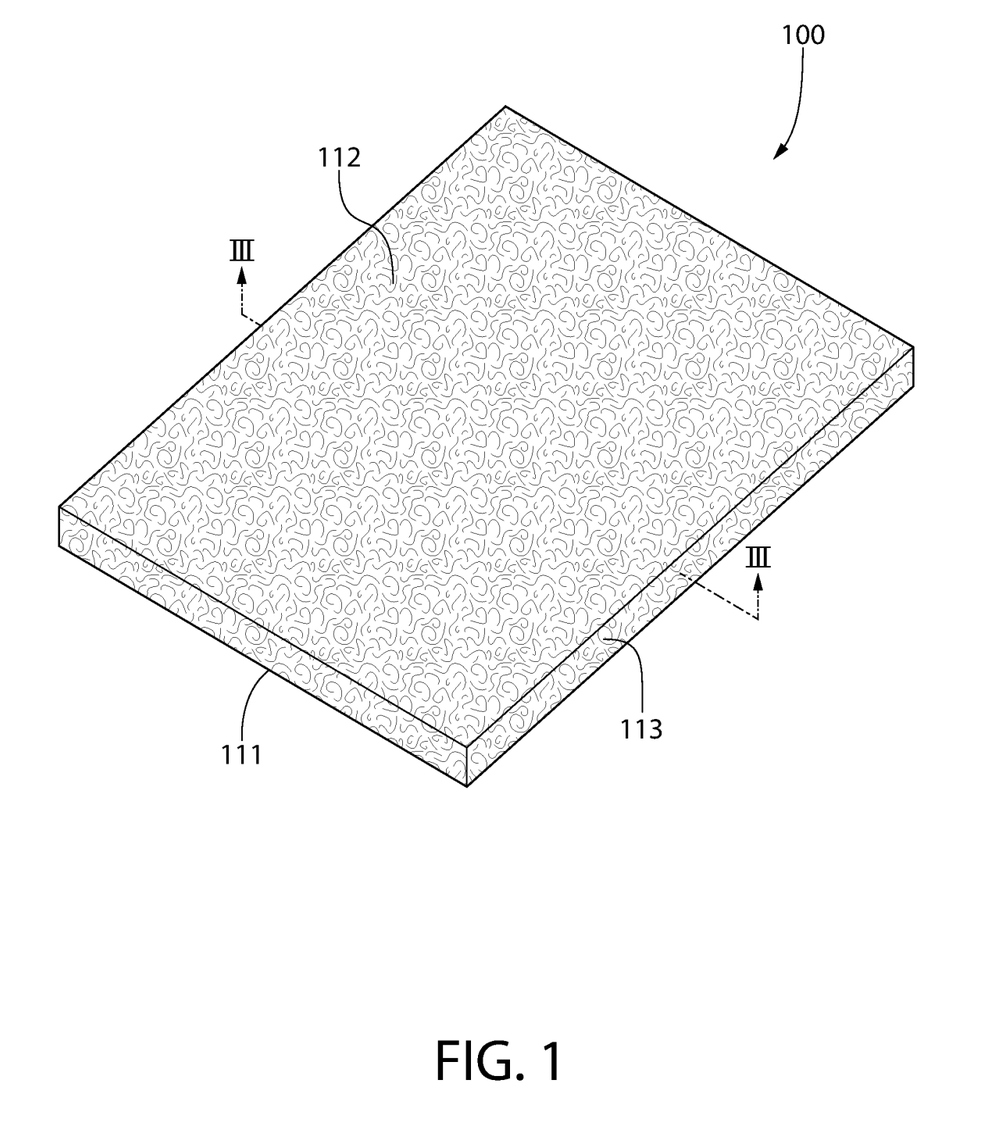
FIG. 1 is top perspective view of a building panel according to the present invention.
Figure 2:
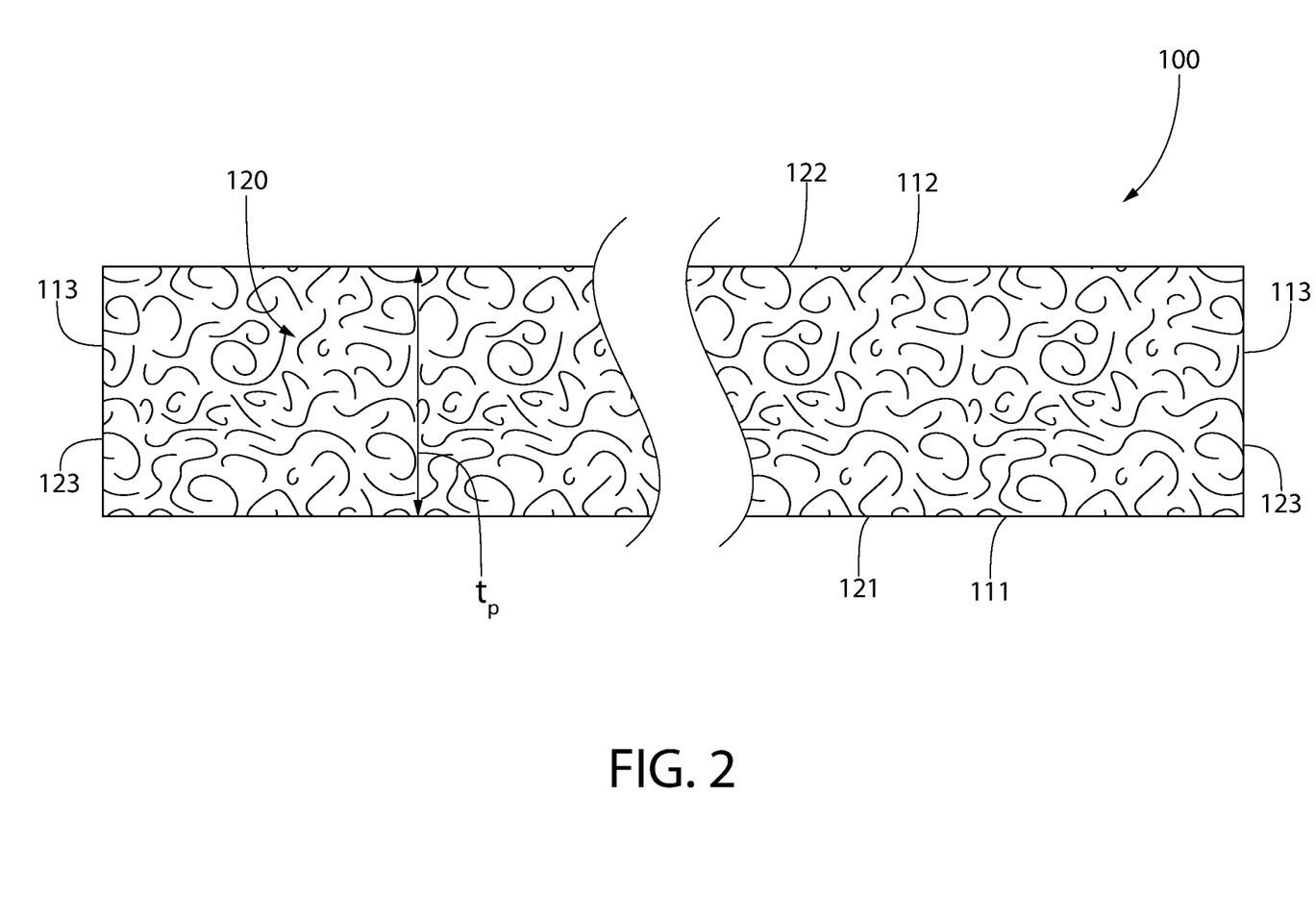
FIG. 2 is a cross-sectional view of the building panel according to the present invention, the cross-sectional view being along the III line set forth in FIG. 1.

Referring to FIGS. 1 and 2, the present invention may include a building panel 100 of the present invention may comprise a first major surface 111 opposite a second major surface 112. The ceiling panel 100 may further comprise a side surface 113 that extends between the first major surface 111 and the second major surface 112, thereby defining a perimeter of the ceiling panel 100.

Figure 3:
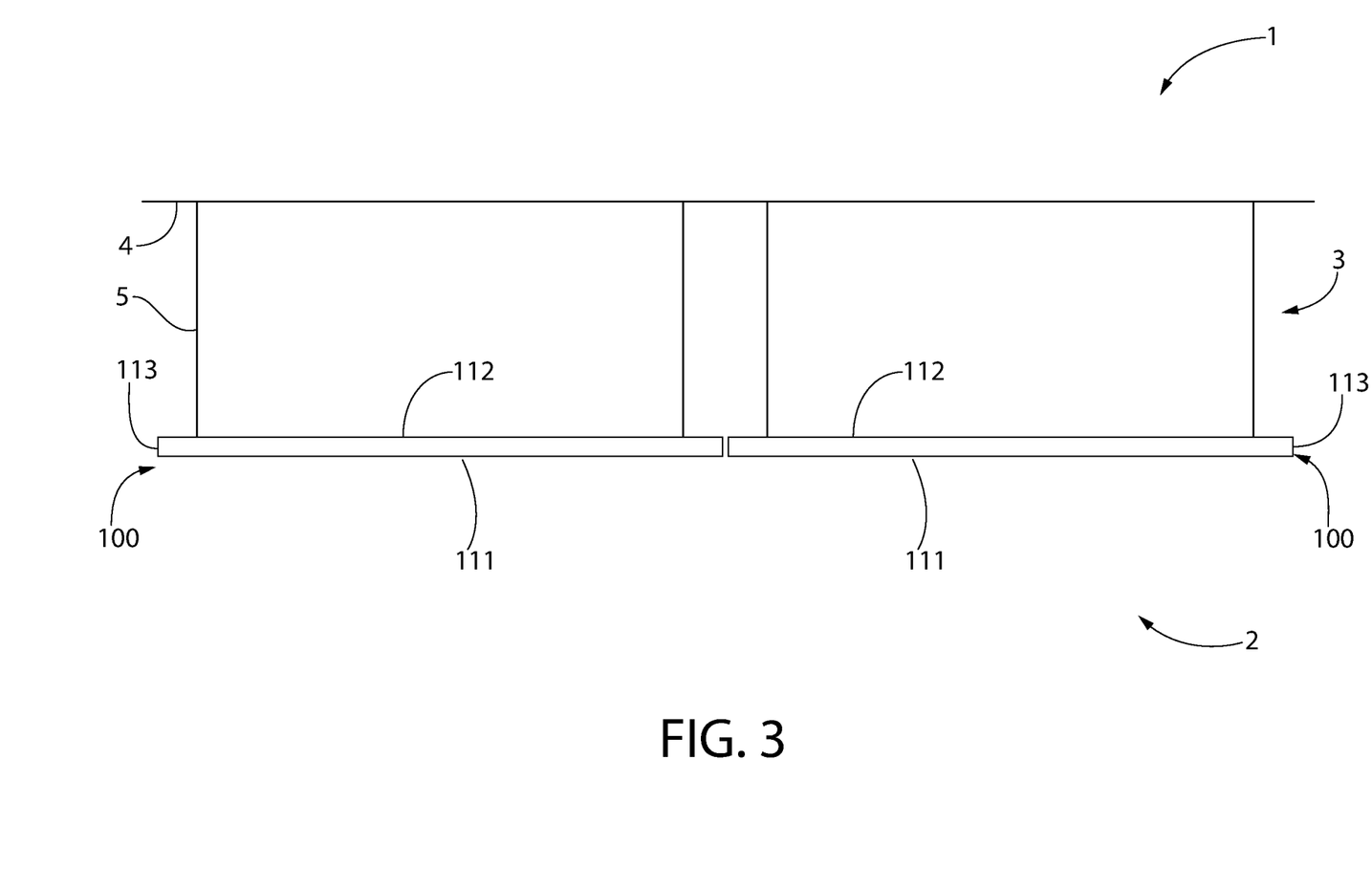
FIG. 3 is a ceiling system comprising the building panel of the present invention

Referring to FIG. 3, the present invention may further include a building system 1 comprising one or more of the building panels 100 installed in an interior space, whereby the interior space comprises a plenary space 3 and an active room environment 2. The plenary space 3 is defined by the space above the building panels 100 and below a structural boundary 4 (i.e., subfloor of the adjacent floor, structural roof, skylight, etc.). The plenary space 3 provides space for mechanical lines 9 within a building (e.g., HVAC, plumbing, etc.). The active space 2 provides room for the building occupants during normal intended use of the building (e.g., in an office building, the active space would be occupied by offices containing computers, lamps, etc.). The For the purposes of this invention, the phrase "ceiling system" may be used in place of "building system," however, the present invention is not limited to only ceiling systems.

Each of the building panels 100 may be supported in the interior space by one or more supports 5. Each of the building panels 10 are installed such that the first major surface 111 of the building panel 100 faces the active room environment 2 and the second major surface 112 of the building panel 100 faces the plenum space 3.

Referring to FIG. 2, the building panel 100 may have a panel thickness "$t_P$" as measured from the first major surface 111 to the second major surface 112. The panel thickness $t_P$ may range from about 25 mils to about 3,000 mils—including all values and sub-ranges there-between. In some embodiments, the panel thickness $t_P$ may range from about 25 mils to about 600 mils—including all values and sub-ranges there-between. In some embodiments, the panel thickness $t_P$ may range from about 700 mils to about 2,000 mils—including all values and sub-ranges there-between.

The building panel 100 may comprise a body 120 formed of a fibrous material and a binder. The fibrous material may be a nonwoven polyester material. The binder may be formed from a infusible waterborne pigmented resin.

The body 120 may comprise an upper surface 121 opposite a lower surface 122. The body 120 may comprise a side surface 123 extending between the upper surface 121 and the lower surface 122. The first major surface 112 of the building panel 100 may comprise the upper surface 121 of the body 120. The second major surface 122 of the building panel 100 may comprise the lower surface 122 of the body 120. The side surface 113 of the building panel 100 may comprise the side surface 123 of the body 120.

The body 120 may be porous—also referred to as a "porous body" 120. The porous body 120 may allow for air and water vapor to flow between the upper surface 121, the lower surface 122, and/or the side surface 123. The body 120 may be porous enough that it allows for enough airflow through the body 120 under atmospheric conditions for the building panel 100 to function as an acoustic ceiling panel, which requires properties related to noise reduction and sound attenuation properties—as discussed further herein.

The body 120 of the present invention may have a porosity ranging from about 80.0% to about 97.0%—including all values and sub-ranges there between. In a preferred embodiment, the body 100 has a porosity ranging from about 91% to 94%—including all values and sub-ranges there between. According to the present invention, porosity refers to the following:

$$\% \text{ Porosity} = [V_{Total} - (V_F + V_{AC})]/V_{Total}$$

Where $V_{Total}$ refers to the total volume of the body 120 defined by the upper surface 121, the lower surface 122, and the side surfaces 123. $V_F$ refers to the total volume occupied by the fibrous material in the body 120. $V_{AC}$ refers to the total volume occupied by the additional components in the body 120 (e.g., binder, pigment, etc.). Thus, the % porosity represents the amount of free volume within the body 100.

The building panel 100 of the present invention comprising the porous body 120 may exhibit sufficient airflow for the building panel 100 to have the ability to reduce the amount of reflected sound in a room. The reduction in amount of reflected sound in a room is expressed by a Noise Reduction Coefficient (NRC) rating as described in American Society for Testing and Materials (ASTM) test method C423. This rating is the average of sound absorption coefficients at four ⅓ octave bands (250, 500, 1000, and 2000 Hz), where, for example, a system having an NRC of 0.90 has about 90% of the absorbing ability of an ideal absorber. A higher NRC value indicates that the material provides better sound absorption and reduced sound reflection.

The building panel 100 of the present invention exhibits an NRC of at least about 0.5. In some embodiments, the building panel 100 of the present invention may have an NRC ranging from about 0.6 to about 1.0—including all value and sub-ranges there-between. In a preferred embodiment, the building panel 100 of the present invention may have an NRC ranging from about 0.5 to about 0.8—including all value and sub-ranges there-between.

The body 120 may be formed of a fibrous material and a binder. The fibrous material may be a nonwoven polyester material. The binder may be formed from a infusible waterborne pigmented resin. The present disclosure is directed towards infusible waterborne pigmented resin compositions useful to impart permanent durable color to basic nonwoven polyester materials. In certain aspects, such compositions further impart fire preventive properties.

In certain embodiments, the present invention is a composition comprising an antimigrant polymer; pigment; ammonium polyphosphate; and an anionic surfactant comprising phosphate. In certain embodiments, the present invention is a composition comprising an antimigrant polymer; pigment; ammonium polyphosphate; a thermoplastic polymer having a glass transition temperature (Tg) of about 93.0° C. or less; and an anionic surfactant comprising phosphate. In further embodiments, the present invention is a polyester felted product comprising a composition comprising an antimigrant polymer; pigment; ammonium polyphosphate; and an anionic surfactant comprising phosphate.

The present invention uses antimigrant polymer. Antimigrant polymer supports pigment retainment in a polyester web core as carrier water evaporates. Without being bound to theory, antimigrant polymer inhibits pigment diffusion from the polyester web core in the presence of water. In certain embodiments, the antimigrant polymer is acrylic copolymer, for example sodium polyacrylate. In certain embodiments, the antimigrant polymer has a viscosity of about 900 cps to about 5000 cps. In certain embodiments, the antimigrant polymer has a pH of between 5.5 to 8.0. In certain embodiments, the antimigrant polymer is commercially available as Unilev 0252 (Unichem, S. Carolina).

The antimigrant polymer may be present at various amounts or concentrations. In certain embodiments, the antimigrant polymer is present in an amount from about 0.1 wt. % to about 3.0 wt. %, based on the dry weight of the composition. For example, the antimigrant polymer may be present in an amount of about 0.1 weight %, about 0.2 weight %, about 0.3 weight %, about 0.4 weight %, about 0.5 weight %, about 0.6 weight %, about 0.7 weight %, about 0.8 weight %, about 0.9 weight %, about 1.0 weight %, about 1.5 weight %, about 2.0 weight %, about 2.5 weight %, or about 3.0 weight %, based on the dry weight of the composition. In another example, the antimigrant polymer may be present in an amount of from about 25.0% to about 40.0%, based on the dry weight of the composition. In further embodiments, the antimigrant polymer is present in an amount of about 25.0% or more, about 30.0% or more, about 33.0% or more, up to about 40.0%, based on the dry weight of the composition. In further embodiments, the antimigrant polymer is present in an amount of about 25.0% to about 30.0%, about 32.0% to about 36.0%, or about 36.0% to about 40.0%, based on the dry weight of the composition.

The present invention uses pigment. Various pigments may be used. In certain embodiments, the pigment is selected from phthalocyanines, naphthols, arylides, inorganics, inorganic oxides, carbon black, chromium oxide, or combinations thereof. The pigment may be present at various amounts or concentrations. In certain embodiments, the pigment is present in an amount from about 0.05% to about 20.0%, based on the weight of the composition. For example, the pigment may be present in an amount of about 0.05 weight %, about 1.0 weight %, about 1.5 weight %, about 2.0 weight %, about 2.5 weight %, about 5.0 weight %, about 7.5 weight %, about 10.0 weight %, about 12.5 weight %, about 13.5 weight %, about 14.5 weight %, about 15.0 weight %, about 15.5 weight %, or about 20.0 weight %, based on the dry weight of the composition. In another example, the pigment may be present in an amount of about 0.05% or more, about 1.0% or more, about 5.0% or more, up to about 20.0%, based on the dry weight of the composition. In further embodiments, the pigment is present in an amount of about 0.05% to about 3.0%, about 3.0% to about 10.0%, or about 10.0% to about 20.0%, based on the dry weight of the composition.

The present invention uses ammonium polyphosphate. Ammonium polyphosphate is useful as flame retardant. In certain embodiments, the ammonium polyphosphate has a pH of about 6.5. In certain embodiments, the ammonium polyphosphate has a density of about 1.9 g/cm$^3$ at 25° C. In certain embodiments, the ammonium polyphosphate has a viscosity of about 100 mPa·s at 25° C.

The ammonium polyphosphate may be present at various amounts or concentrations. In certain embodiments, the ammonium polyphosphate is present in an amount in which a limited addition of this powder suppresses flaming droplets in a fire, while not interfering with the polyester retreat from a flame. The ammonium polyphosphate may be present in an amount from about 20.0% to about 35.0%, based on the weight of the composition. Compositions exceeding 35% begins to adversely affect polyester flame retreat and self-extinguish. For example, the ammonium polyphosphate may be present in an amount of about 20.0 weight %, about 22.5 weight %, about 25.0 weight %, about 27.5 weight %, about 30.0 weight %, about 32.5 weight %, or about 35.0 weight %, based on the dry weight of the composition. In another example, the ammonium polyphosphate may be present in an amount of about 20.0% or more, about 22.5% or more, about 25.0% or more, up to about 35.0%, based on the dry weight of the composition. In further embodiments, the ammonium polyphosphate is present in an amount of about 20.0% to about 30.0%, about 25.0% to about 35.0%, or about 25.0% to about 35.0%, based on the dry weight of the composition.

Addition of any other inorganic filler (e.g., ATH, calcium carbonate), even at low levels, destroys the polyester flame retreat mechanism. Therefore, in certain embodiments, the composition is substantially free of inorganic filler.

The present invention uses anionic surfactant as a foaming agent. In certain embodiments, the anionic surfactant is a phosphate based anionic surfactant. In certain embodiments, the anionic surfactant is polyoxyethylene branched tridecyl phosphate. The anionic surfactant may be present at various amounts or concentrations. In certain embodiments, the anionic surfactant may be present in an amount from about 1.5% to about 20.0%, based on the weight of the composition. For example, the anionic surfactant may be present in an amount of about 1.5 weight %, about 2.0 weight %, about 2.5 weight %, about 3.0 weight %, about 3.5 weight %, about 5.0 weight %, about 10.0 weight %, or about 20.0 weight %, based on the dry weight of the composition. In another example, the anionic surfactant may be present in an amount of about 1.5% or more, about 2.0% or more, about 5.0% or more, up to about 20.0%, based on the dry weight of the composition. In further embodiments, the anionic surfactant is present in an amount of about 1.5% to about 10.0%, about 10.0% to about 15.0%, or about 15.0% to about 20.0%, based on the dry weight of the composition.

In certain embodiments, the present invention includes a thermoplastic polymer. In some embodiments, the thermoplastic polymer is a latex. In certain embodiments, the thermoplastic polymer is a resin. In some embodiments, the thermoplastic polymer has a glass transition temperature (Tg) of about 93.0° C. or less. In some embodiments, the thermoplastic polymer has a glass transition temperature (Tg) of about 82.2° C. or less. Without being bound to theory, it is believed that such polymers coalesce to develop the coverage and strength required to adhere the pigment to the non-woven polyester substrate without causing the polyester fibers to soften and impact the structure of the material. Non-limiting examples of such thermoplastic polymer include poly(vinyl acetate) (PVA), acrylic and vinyl-acrylic latexes, (carboxylated styrene butadiene) SBR, polyurethanes, acrylonitrile butadiene styrene (ABS) polymers, and sulfonated polyester latex.

The thermoplastic polymer may be present at various amounts or concentrations. In certain embodiments, the thermoplastic polymer may be present in an amount from about 0.001% to about 60.0%, based on the weight of the composition. For example, the thermoplastic polymer may be present in an amount of about 0.001 weight %, about 2.0 weight %, about 5.0 weight %, about 15.0 weight %, about 25.0 weight %, about 30.0 weight %, about 35.0 weight %, about 40.0 weight %, about 50.0 weight %, or about 60.0 weight %, based on the dry weight of the composition. In another example, the thermoplastic polymer may be present in an amount of about 1.5% or more, about 10.0% or more, about 15.0% or more, about 25.0% or more, about 35.0% or more, about 45.0% or more, about 55.0% or more, up to about 60.0%, based on the dry weight of the composition. In further embodiments, the thermoplastic polymer is present in an amount of about 10.5% to about 35.0%, about 35.0% to about 55.0%, or about 40.0% to about 60.0%, based on the dry weight of the composition.

In certain embodiments, the dry percent ratio of ammonium polyphosphate to thermoplastic polymer is between 0.45 to 0.75. In certain embodiments, the dry percent ratio of ammonium polyphosphate to thermoplastic polymer is about 0.55 to 0.65

In certain embodiments, the compositions comprise a wetting agent. In certain embodiments, the wetting agent is sodium dioctyl sulfosuccinate. The wetting agent may be present in an amount ranging from about 0.2 wt. % to about 4.0 wt. %, based on the total dry weight. In certain embodiments, the wetting agent may be present in an amount ranging from about 1.0 wt. % to about 3.0 wt. % based on the total dry weight.

Compositions of the invention are useful for the colorization of polyester containing products—including the building panel 100 of the present invention. In certain embodiments, the products comprises homopolymers of polyester. In certain embodiments, the product comprises co-polymers of polyester, for example, but not limited to, polyester and bico. In certain embodiments, the product is a nonwoven polyester containing product. In certain embodiments, the product is a nonwoven polyester/bico containing product. In certain embodiments, the product is a mat. In certain embodiments, the product is a polyester containing felt product. In certain embodiments, the product is a polyester containing acoustical felt product. In certain embodiments, the product is a nonwoven acoustical felt product comprising polyester. In certain embodiments, the product is a nonwoven acoustical felt product comprising a homopolymer or copolymer of polyester. In certain embodiments, the polyester comprises homopolymers or copolymers of polyethylene terephthalate (PET).

Certain aspects of the invention encompass a method to infuse color into a polyester product, comprising exposing the polyester product to a composition as described herein. The color may be infused to the polyester product by way of general methods known in the art. Non-limiting examples include fluid curtain-coat, high volume spray coat, utilization of controlled viscosity and/or vacuum, dip and squeeze, or pressurized slot-die infusion. In certain embodiments, the components of the composition may be mixed in a wet state, incubated with a non-woven polyester material, and dried. In certain embodiments, the polyester product is a polyester acoustical felted product. In certain embodiments, the drying step is performed at or below 93.0° C.

EXAMPLES

The examples and other implementations described herein are exemplary and not intended to be limiting in describing the full scope of compositions and methods of this disclosure. Equivalent changes, modifications and variations of specific implementations, materials, compositions, and methods may be made within the scope of the present disclosure, with substantially similar results.

Example 1: Exemplary color infusion compositions were prepared as shown in Table 1. Where multiple components are listed for a particular category, this is representative of each component being tested in individual compositions.

TABLE 1

Exemplary compositions.

| Component Category | Component | Concentration (dry wt. %) |
|---|---|---|
| Thermoplastic Polymer | Sulfonated polyester latex Poly(vinyl acetate) (PVA) Acrylic Vinyl-acrylic | Range 0-60 Preferred 35-60 |

TABLE 1-continued

Exemplary compositions.

| Component Category | Component | Concentration (dry wt. %) |
|---|---|---|
| Antimigration polymer | Unilev 0252 (Unichem, S. Carolina) | 0.1-3.0 |
| Pigment | Phthalocyanines Naphthols Arylides Carbon black Chromium oxide | 0.05-20 |
| Flame-retardant | Ammonium polyphosphate | 20-35 |
| Foaming agent | Polyoxyethylene branched tridecyl phosphate Alkyl ethoxylates Sodium laureth sulfate | 4-20 |

Compositions represented in Table 1 were prepared and infused into white polyester nonwoven webs. Briefly, aqueous pigment dispersions of the compositions were infused into the web and heat dried at about 110° C. Total dry composition added onto the polyester web ranged from about 0.1 wt. % to about 20 wt. %, and was typically about 2.77 wt. %. Samples were wetted in water and observed for color retention properties. Samples were also subjected to horizontal burn tests.

Various thermoplastic polymers having a glass transition temperature (Tg) of about 93.0° C. or less were tested. Each polymer properly coalesced to develop the coverage and strength required to adhere pigment to the polyester web, without causing the polyester web fibers to soften and impact the structure of the substrate.

Various foaming agents were tested. Surprisingly and unexpectedly, use of polyoxyethylene branched tridecyl phosphate as a foaming agent provided for superior color retention upon wetting with water. By contrast, use of alkyl ethoxylates or sodium laureth sulfate as a foaming agent appeared to interfere with resin binding and rendered the product to be not color-fast when wetted with water.

For compositions having 0% thermoplastic polymer, coloration was slightly washed off when wetted with water. For compositions having greater than 0% thermoplastic polymer, coloration and color retention were improved.

Example 2: A test composition 2 was prepared according to the formulation as shown in Table 2.

TABLE 2

Test Composition 2.

| Material | Component % Solids | Amount Added (lb.) | Wet wt. % | Dry Film wt. % |
|---|---|---|---|---|
| Water | 0.0 | 1.408 | 93.6 | 0.0 |
| Sodium dioctyl sulfosuccinate | 100 | 0.001 | 0.0 | 2.4 |
| Antimigrant polymer | 13 | 0.069 | 4.60 | 28.6 |
| Pigment | 50 | 0.009 | 0.61 | 14.7 |
| Ammonium polyphosphate | 100 | 0.0171 | 1.1375 | 54.33 |
| Total | | 1.5 | 100 | 100 |

Composition 2 was infused onto a ½" white polyester 0.387 lb/ft² and having a density of 9.29 lb/ft³. The infused composition was dried at 130° C. for about 60 minutes, which is 20° C. above the melting temperature of the polyester, and cooled. The dry composition add on was 49.98 g/m² to the polyester web. Handling and rubbing of the dry sample did not result in blue staining on the fingers. Rubbing with a wet paper towel did pick up some blue staining. Immersing the sample, with squeezing, in water for 10 minutes turned the water slightly blue. However, re-soaking the sample for a further 2 to 3 hours followed by immersion in new clean water for a further 15 hours showed only very slight blue tinting of the water.

Example 3: A test composition 3 was prepared according to the formulation as shown in Table 3.

TABLE 3

Test Composition 3.

| Material | Component % Solids | Amount Added (lb.) | Wet wt. % | Dry Film wt. % |
|---|---|---|---|---|
| Water | 0.0 | 1.636 | 90.6 | 0.0 |
| Sodium dioctyl sulfosuccinate | 100 | 0.001 | 0.0 | 2.2 |
| Antimigrant polymer | 13 | 0.111 | 6.13 | 34.8 |
| Pigment | 50 | 0.011 | 0.61 | 13.4 |
| Ammonium polyphosphate | 100 | 0.0077 | 0.4266 | 18.6 |
| Sulfonated polyester latex | 33 | 0.039 | 2.154 | 31.01 |
| Total | | 1.8 | 100 | 100 |

Composition 3 was infused onto a ½" white polyester 0.387 lb/ft² and having a density of 9.29 lb/ft³. The infused composition was dried at 120° C. for about 60 minutes and cooled. The dry composition add on was 128.94 g/m² to the polyester web. Handling and rubbing of the dry sample did not result in blue staining on the fingers. Rubbing with a wet paper towel did not pick up some blue staining. A sample immersed, with squeezing, in water for 10 minutes did not turn the water blue. Re-soaking the sample for a further 2 to 3 hours did not turn the water blue.

Example 4: Control color infusion compositions were prepared and were used to infuse color into white 25 mm thick polyester nonwoven web substrate. Fire performance of the color infused substrate was then analyzed and results reported in Table 4.

TABLE 4

Fire testing results of control color infusion compositions.

| Infused Color | Flame Spread | Smoke Developed |
|---|---|---|
| None | 0 | 350 |
| Black | 15 | 600 |
| Beige | 0 | 600 |
| Light grey | 110 | 500 |
| Dark grey | 20 | 500 |

In order to qualify as an E84 Class A fire rating, a flame spread of 25 or less and smoke developed at 450 or less must be exhibited. As shown in Table 4, while the initial polyester material qualified as having a E84 Class A fire rating, infusion with color negatively affected the flame spread and/or smoke developed from the color infused material, thus causing a loss of a E84 Class A fire rating.

Example 5: Further test compositions were prepared varying the dry percent ratio of ammonium polyphosphate to thermoplastic polymer. Compositions below 0.45 dry percent ratio of ammonium polyphosphate to thermoplastic polymer showed flaming droplets from burning samples. Compositions above 0.75 dry percent ratio of ammonium polyphosphate to thermoplastic polymer showed the melt/retreat of the PET web impeded. Compositions between 0.45 to 0.75 dry percent ratio of ammonium polyphosphate to thermoplastic polymer showed optimal burning characteristics. Surprisingly and unexpectedly, these color infused substrates maintained their E84 Class A fire rating.

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:

1. A composition comprising:
    an antimigrant polymer comprising sodium polyacrylate;
    pigment;
    ammonium polyphosphate; and
    an anionic surfactant comprising polyoxyethylene branched tridecyl phosphate.

2. The composition of claim 1, wherein the antimigrant polymer has a viscosity of about 900 cps to about 5000 cps.

3. The composition of claim 2, wherein the antimigrant polymer has a pH of between 4.5 to 8.0.

4. The composition of claim 1, wherein the pigment is present in an amount from about 0.05% to about 20.0%, based on the weight of the composition.

5. The composition of claim 1, wherein the ammonium polyphosphate has a pH of about 6.5.

6. The composition of claim 1, wherein the ammonium polyphosphate has a viscosity of about 100 mPa·s at 25° C.

7. A composition comprising:
    an antimigrant polymer;
    pigment;
    ammonium polyphosphate;
    a thermoplastic polymer having a glass transition temperature (Tg) of 93.0° C. or less; and
    an anionic surfactant comprising polyoxyethylene branched tridecyl phosphate.

8. The composition of claim 7, wherein the antimigrant polymer has a viscosity of about 900 cps to about 5000 cps.

9. The composition of claim 8, wherein the antimigrant polymer has a pH of between 5.5 to 8.0.

10. The composition of claim 7, wherein the pigment is present in an amount from about 0.05% to about 20.0%, based on the weight of the composition.

11. The composition of claim 7, wherein the thermoplastic polymer is selected from sulfonated polyester, poly(vinyl acetate), acrylic, and vinyl-acrylic.

12. The composition of claim 7, wherein the thermoplastic polymer is present in an amount from about 0.001% to about 60.0%, based on the dry weight of the product.

13. The composition of claim 7, wherein the ammonium polyphosphate is present in an amount ranging from about 25% to about 35% based on the total dry weight of the composition and wherein the thermoplastic polymer is present in an amount ranging from about 10.5% to about 36% based on the total dry weight of the composition.

14. A nonwoven polyester product comprising a composition comprising:
   an antimigrant polymer comprising an acrylic copolymer;
   pigment;
   ammonium polyphosphate; and
   an anionic surfactant comprising polyoxyethylene branched tridecyl phosphate.

15. The nonwoven polyester product of claim 14, wherein the antimigrant polymer has a viscosity of about 900 cps to about 5000 cps; and wherein the antimigrant polymer has a pH of between 5.5 to 8.0.

16. The nonwoven polyester product of claim 14, wherein the antimigrant polymer is present in an amount of about 0.1 to about 3.0%, based on the dry weight of the product.

17. The nonwoven polyester product of claim 14, wherein the pigment is selected from phthalocyanines, naphthols, arylides, inorganics, inorganic oxides, carbon black, chromium oxide, or combinations thereof.

18. The nonwoven polyester product of claim 14, wherein the pigment is present in an amount from about 0.05% to about 20.0%, based on the dry weight of the product.

19. The nonwoven polyester product of claim 14, wherein the ammonium polyphosphate has a pH of about 6.5.

20. The composition of claim 7, wherein the antimigrant polymer comprises sodium polyacrylate.

* * * * *